US008605734B2

(12) United States Patent
Ichino

(10) Patent No.: US 8,605,734 B2
(45) Date of Patent: Dec. 10, 2013

(54) OPENFLOW COMMUNICATION SYSTEM AND OPENFLOW COMMUNICATION METHOD

(75) Inventor: Kiyohisa Ichino, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 13/176,619

(22) Filed: Jul. 5, 2011

(65) Prior Publication Data

US 2011/0261825 A1    Oct. 27, 2011

Related U.S. Application Data

(63) Continuation of application No. PCT/JP2010/052665, filed on Feb. 23, 2010.

(30) Foreign Application Priority Data

Mar. 9, 2009  (JP) ................................. 2009-055739

(51) Int. Cl.
  *G06F 15/177*  (2006.01)
(52) U.S. Cl.
  USPC ............ 370/400; 370/351; 370/389; 709/220
(58) Field of Classification Search
  USPC ......... 370/389, 392, 352–356, 400, 351, 254, 370/401, 395.5, 230; 709/223, 225, 224, 709/242, 228
  See application file for complete search history.

(56) References Cited

U.S. PATENT DOCUMENTS

| 6,839,346 | B1 | 1/2005 | Kametani |
| 7,099,324 | B2 | 8/2006 | Kametani |
| 7,664,088 | B2 | 2/2010 | Ko et al. |
| 8,085,791 | B1 * | 12/2011 | Aggarwal et al. ............. 370/400 |
| 2006/0133300 | A1 * | 6/2006 | Lee et al. ...................... 370/254 |
| 2007/0206591 | A1 * | 9/2007 | Doviak et al. ................. 370/389 |
| 2008/0037546 | A1 * | 2/2008 | Ishikawa et al. .............. 370/392 |
| 2008/0170578 | A1 * | 7/2008 | Ould-Brahim ................ 370/401 |
| 2009/0138577 | A1 * | 5/2009 | Casado et al. ................ 709/220 |

FOREIGN PATENT DOCUMENTS

| JP | 11-341060 A | 12/1999 |
| JP | 2000-295274 A | 10/2000 |
| JP | 2001-168910 A | 6/2001 |
| JP | 2004-56340 A | 2/2004 |
| JP | 2005-191922 A | 7/2005 |
| JP | 2005-354579 A | 12/2005 |
| JP | 2007-159146 A | 6/2007 |

* cited by examiner

*Primary Examiner* — Dang Ton
*Assistant Examiner* — Sai Aung
(74) *Attorney, Agent, or Firm* — McGinn IP Law Group, PLLC

(57) ABSTRACT

An OpenFlow switch controls transmission and reception of a packet according to a flow entry. Each of the flow entries contains a matching condition showing a communication flow of the packet and an action showing processing on the packet. An OpenFlow controller generates a registration flow entry which is stored in a flow table of a specific OpenFlow switch arranged on a route of the communication flow. An encapsulated packet is generated by relating the registration flow entry and an ordinary packet. The specific OpenFlow switch extracts the registration flow entry from the encapsulated packet in response to the reception of the encapsulated packet to produce a new flow entry and executes the action shown in the new flow entry.

20 Claims, 15 Drawing Sheets

PROCESSING OF OpenFlow SWITCH 11

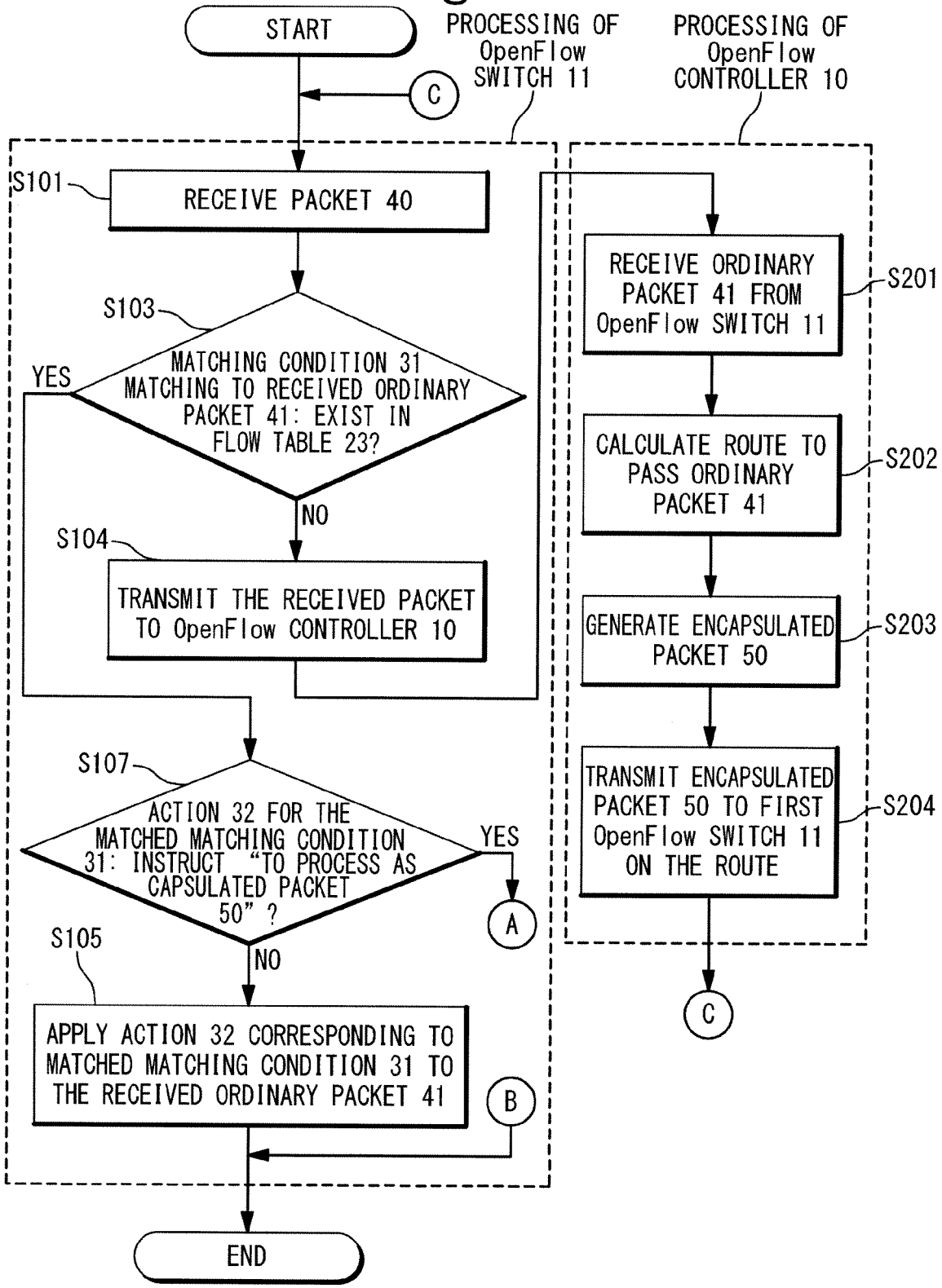

OPENFLOW COMMUNICATION SYSTEM AND OPENFLOW COMMUNICATION METHOD

CROSS-REFERENCE TO RELATED APPLICATION

This is a continuation of International Application No. PCT/JP2010/052665, filed on Feb. 23, 2010.

TECHNICAL FIELD

The present invention is related to an OpenFlow communication system and an OpenFlow communication method.

BACKGROUND ART

Various techniques about a computer network are known (for example, refer to Patent Literatures 1 to 4). In Patent Literature 1, a technique of an IP flow table is described in which IP/MAC source address and destination address and an output physical port number are registered. In Patent Literature 2, a technique of a communication unit is described in which a route to another communication unit is determined based on stored routing information and also the routing information is updated according to update information. In Patent Literature 3, a technique of a packet relay unit is described in which a change of route information is received and corresponding information of a route table is registered, deleted and changed. In Patent Literature 4, a technique of a transmission route information addition function is described in which set route information is added to a packet which is transmitted to a relay unit. Also, a technique of the relay unit is described in which the route information is extracted from a received packet and when the packet is not destined to the relay unit, the packet is transferred to another relay unit.

A computer network such as Ethernet (registered trademark) is a distribution type that a switch (or a router) operates independently. For this reason, it is difficult to correctly and quickly grasp a phenomenon which happens in the network, and it takes a long time to specify a fault occurrence portion and recover from the fault. Also, because it is necessary for each switch to have capability enough to operating independently, the function of the switch becomes complicated.

In order to solve such a problem, a new network architecture which is called OpenFlow has been proposed (for example, refer to Non-Patent Literature 1). The OpenFlow realizes visualization of a network in a high level by performing the centralized control on the network as in a telephone network. Also, in the OpenFlow, it is possible to relatively reduce the function to be accomplished by the switch. Therefore, the switch becomes cheaper so that the cost of the whole network can be lowered.

FIG. 1 is a block diagram showing a configuration of a network system which is based on the OpenFlow (hereinafter, to be referred to as an "OpenFlow communication system"). The OpenFlow communication system is provided with an OpenFlow controller 10, OpenFlow switches 11 and links 13 which link them, as main components. FIG. 1 shows the OpenFlow communication system which is provided with a plurality of the OpenFlow switches 11. In the following description, to distinguish the plurality of the OpenFlow switches 11 from each other, a branch number is used, as a first OpenFlow switch 11-1.

The OpenFlow controller 10 is charged with a plurality of roles. The OpenFlow controller 10 performs the recognition of a network topology, the control of the OpenFlow switches 11, the monitoring of a fault in the OpenFlow switches 11 and the link 13, the determination of a communication route for a packet 40, and so on.

The OpenFlow switch 11 relays packets 40 from a neighbor terminal 12 and another OpenFlow switch 11, like an existing Ethernet (registered trademark) switch and an IP router. It should be noted that in the following description, to distinguish the plurality of the terminals 12 from each other, a branch number is used as a first terminal 12-1.

FIG. 2 is a block diagram showing a configuration of the OpenFlow switch 11. The OpenFlow switch 11 is provided with input ports 20, output ports 21, a local managing section 22, a flow table 23 and a packet switch 24, as main components.

The input port 20 receives the packet 40 from another OpenFlow switch 11 or terminal 12. The output port 21 transmits the packet 40 to another OpenFlow switch 11 or terminal 12.

The local managing section 22 communicates with the OpenFlow controller 10 and updates the flow table 23 according to an instruction from the OpenFlow controller 10. Also, the local managing section 22 supplies the packet 40 to the packet switch 24 in response to an instruction from the OpenFlow controller 10. Moreover, the local managing section 22 transmits the packet 40 received through the input port 20 from an external unit to the OpenFlow controller 10 according to necessity.

The packet switch 24 transfers the packet 40 for the output port 21 obtained by referring to the flow table 23 or the output port 21 instructed by the local managing section 22. The flow table 23 stores data used to handle the packet 40 supplied to the OpenFlow switch 11.

FIG. 3 is a block diagram showing the configuration of the flow table 23. The flow table 23 retains a set of flow entries 30. Each flow entry 30 is provided with two fields of a matching condition 31 and an action 32.

Every time the OpenFlow switch 11 receives the packet 40 from the external unit, the OpenFlow switch 11 refers to the flow table 23 to compare the packet 40 and the matching conditions 31. For example, when one of the matching conditions 31 is met, the action 32 corresponding to the matching condition 31 is applied to the packet 40. When the packet 40 does not meet all the matching conditions 31, the OpenFlow switch 11 transmits the packet 40 to the OpenFlow controller 10. Each matching condition 31 includes a protocol number of network layer (IP), source/destination addresses, source/destination port numbers in a transport layer (TCP or UDP), MAC addresses of source/destination in a data link layer (Ethernet (registered trademark)), a type value, a conditional equation of VLAN-ID and so on.

Operations such as "output the packet 40 for a specific output port 21", "discard the packet 40", or so on are defined by the action 32.

FIG. 4 is a flow chart showing an operation of the OpenFlow controller 10 and the OpenFlow switch 11. FIG. 4 shows a communication flow from a first terminal 12-1 as a transmission source to a third terminal 12-3 as a destination in the OpenFlow communication system shown in FIG. 1. Also, it is supposed that the flow tables 23 of all the OpenFlow switches 11 are empty (Empty) in the initial state.

The first terminal 12-1 transmits a first packet 40 which belongs to a flow. At step S1, the first OpenFlow switch 11-1 receives the packet 40 at the input port 20. Then, at step S2, the first OpenFlow switch 11-1 checks whether or not the matching condition 31 matching to the packet 40 exists in the flow table 23. Because the flow table 23 is empty at this point, the search of the flow table 23 fails (arrow to No). At step S3, the first OpenFlow switch 11-1 transmits the packet 40 to the OpenFlow controller 10.

At step S11, the OpenFlow controller 10 receives the packet 40 from first OpenFlow switch 11-1. At step S12, the OpenFlow controller 10 extracts an address of the terminal 12 (first terminal 12-1) as a transmission source and an address of the terminal 12 (third terminal 12-3) as a destination and so on from the packet 40, and calculates a route for the packet 40 to be transferred. The OpenFlow controller 10 can select an appropriate route because it grasps the topology of the network. Referring to FIG. 1, the communication route of the packet 40 is determined as a route from the first OpenFlow switch 11-1 to the second the OpenFlow switch 11-2, to the third OpenFlow switch 11-3.

At step S13, the OpenFlow controller 10 issues instructions to all the OpenFlow switches 11 on the route, to update the flow tables 23, after the calculation of the route.

At step S4, each of the first OpenFlow switch 11-1 to the third OpenFlow switch 11-3 adds a new flow entry 30 to the flow table 23 in response to the instruction from the OpenFlow controller 10.

FIG. 5 is a block diagram showing the configuration of the flow table 23 to which the new flow entry 30 is added. The state of the flow table 23 before the addition is shown in (a) of FIG. 5, and (b) of FIG. 5 shows the state of the flow table 23 after the addition, in each of the first OpenFlow switch 11-1 to the third OpenFlow switch 11-3.

Referring to FIG. 4 again, at step S14, the OpenFlow controller 10 transmits back the packet 40 to the first OpenFlow switch 11-1. At this time, the OpenFlow controller 10 instructs to the first OpenFlow switch 11-1 to transmit the packet 40 through the output port 21 connected with second OpenFlow switch 11-2. The reason is in that the second OpenFlow switch 11-2 is located on the second position on the route.

At step S6, the first OpenFlow switch 11-1 transmits the packet 40 returned from the OpenFlow controller 10 for the second OpenFlow switch 11-2 in response to the instruction.

Next, the control flow shifts to the processing of the second OpenFlow switch 11-2. The second OpenFlow switch 11-2 receives the packet from the first OpenFlow switch 11-1 at step S1, checks at step S2 whether or not the matching condition 31 matching to the packet 40 exists in the flow table 23. At this point, the flow table 23 of the second OpenFlow switch 11-2 has been set to the state shown in (b) of FIG. 5. Therefore, the search of the flow table 23 succeeds (arrow to Yes at step S2). The action 32 corresponding to the matching condition 31 is applied to the packet 40 (Step S5).

Referring to FIG. 5, because the action 32 is "output for the third OpenFlow switch 11-3" in this example, the packet 40 is transmitted to the third OpenFlow switch 11-3 through the output port 21 connected with the third OpenFlow switch 11-3. Because the operation of the third OpenFlow switch 11-3 is the same as that of the second OpenFlow switch 11-2, the description is omitted.

As mentioned above, the first packet 40 of the flow is relayed and is finally sent to the third terminal 12-3 as the destination. The subsequent packet 40 which belongs to the same flow is transferred to the destination while passing from the first OpenFlow switch 11-1, to the second OpenFlow switch 11-2, to the third OpenFlow switch 11-3 in order, without going through the OpenFlow controller 10.

Specifically, the matching condition 31 matching to the packet 40 has been registered on the flow tables 23 of these OpenFlow switches 11 at this point. Therefore, the control flow advances to the step S5 of FIG. 4. Then, the action 32 corresponding to the matching condition 31 is applied to the packet 40. Thus, the above-mentioned flow is realized.

CITATION LIST

Patent Literature

[Patent Literature 1]: JP 2000-295274A
[Patent Literature 2]: JP 2005-191922A
[Patent Literature 3]: JP 2005-354579A
[Patent Literature 4]: JP-A-Heisei 11-341060

Non-Patent Literature

[Non-Patent Literature 1]: OpenFlow Switch Consortium (http://www.openflowswitch.org/)

SUMMARY OF THE INVENTION

In a large scale network composed of a few hundreds of switches or more, a packet 40 is transferred through many switches. In such a case, the OpenFlow controller 10 instructs each of the many OpenFlow switches 11 on the route to update of the flow table 23 each time a new flow is generated.

For example, in a situation that 10 switches in average intervene on the route and 10,000 new flows per 1 second are generated, the update frequency of the flow table 23 becomes 100,000 times per second. Because it is not in practical that a single OpenFlow controller 10 performs the processing, a technique is adopted that a plurality of OpenFlow controllers 10 are arrange for the load balance. However, such a scheme introduces the increase of a facility cost and a management cost in accompaniment with increase of the number of OpenFlow controllers 10, and complication of the OpenFlow controller 10 because a mechanism for synchronization establishment among plurality of OpenFlow controllers 10 becomes necessary separately.

The present invention is accomplished in view of the above-mentioned circumstances, and it is an object to lower the processing load of the OpenFlow controller 10 by reducing the number of instructions from the OpenFlow controller 10 to the OpenFlow switches 11 to update flow tables 23, without changing the scale and configuration of the network.

In order to attain the above-mentioned subject, a communication system includes is provided with at least switch connected with a network to perform transfer of packets and a controller configured to control the switch. It is desirable that the packets include an ordinary packet transmitted and received between terminals in the network and an encapsulated packet supplied from the controller. It is desirable that the switch includes a flow table which can retain a plurality of flow entries; and a local managing section configured to control the transfer of each of the packets based on a corresponding one of the plurality of flow entries. It is desirable that each of the plurality of flow entries comprises a matching condition to identify a communication flow of the packet and an action which shows processing of the packet. It is desirable that the controller generates at least one registration flow entry to be stored in the flow table of at least one passage switch which exists on a route of the communication flow, and relates the registration flow entry and the ordinary packet to generate the encapsulated packet, and transmits the encapsulated packet to the passage switch. The passage switch extracts the registration flow entry from the encapsulated packet in response to reception of the encapsulated packet, to store in the flow table of the passage switch as a new flow entry, and executes an action shown by the new flow entry to the encapsulated packet.

Briefly describing the effect obtained by a typical one of the disclosed inventions, the OpenFlow communication system can be built in which processing load of the OpenFlow controller 10 can be reduced.

According to the present invention, the OpenFlow controller 10 transmits the route information of the packet 40 to the first OpenFlow switch 11 on the route, and route information is registered to the flow tables 23 of the OpenFlow switches 11 on the route, while relaying route information with the packet 40 along the route. By this configuration and operation, the number of times of the update instruction of the flow table 23 issued from the OpenFlow controller 10 to the OpenFlow switch 11 can reduced.

BRIEF DESCRIPTION OF THE DRAWINGS

The objects, the effects, and the features of the present invention could be made clearer in cooperation with the description of the exemplary embodiments and the attached drawings.

FIG. 15 is a flow chart showing an operation of the OpenFlow communication system in the second exemplary embodiment.

DESCRIPTION OF EXEMPLARY EMBODIMENTS

Figure 1:
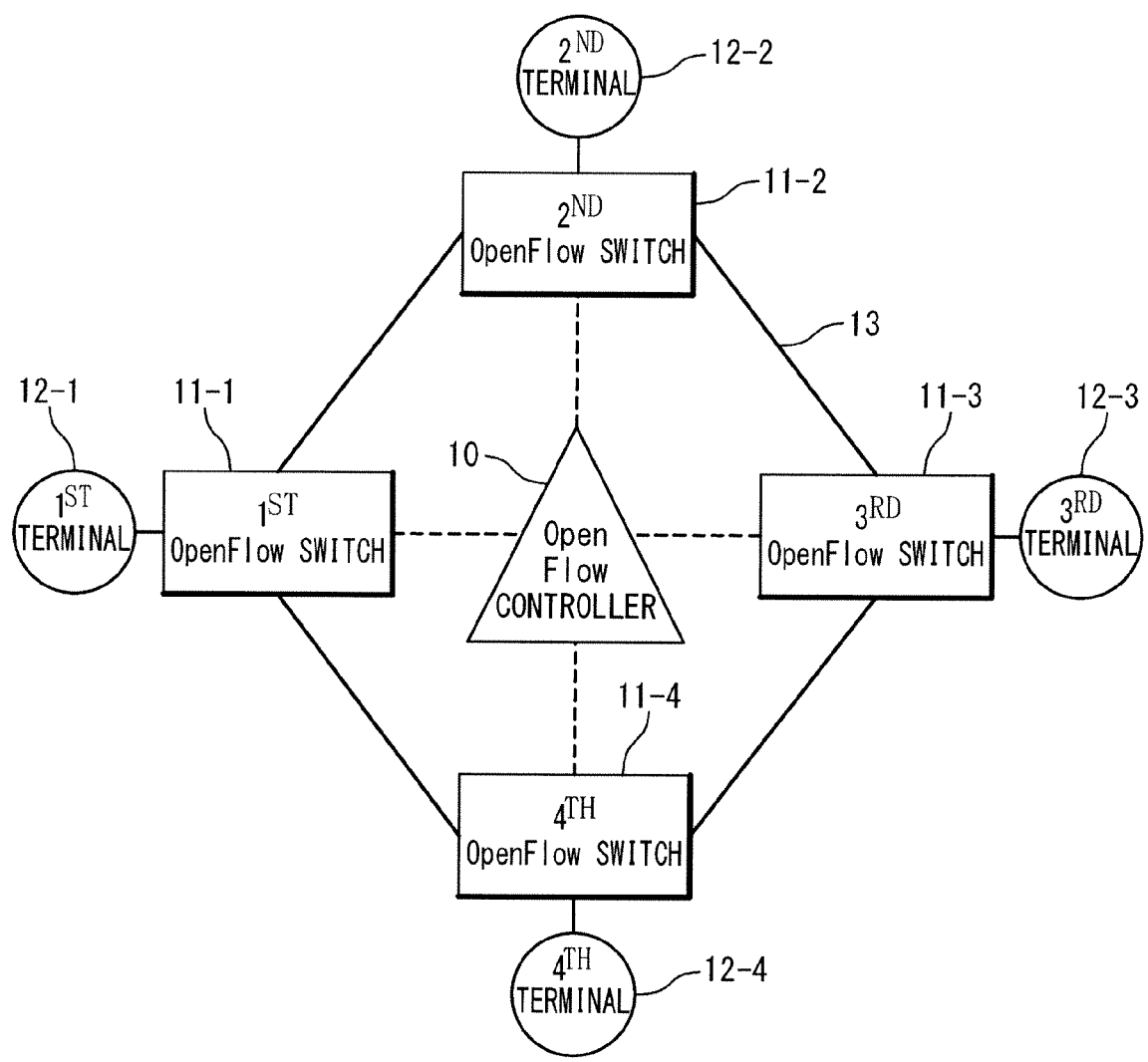
FIG. 1 is a block diagram showing a configuration of a network which is based on the OpenFlow.
Figure 2:
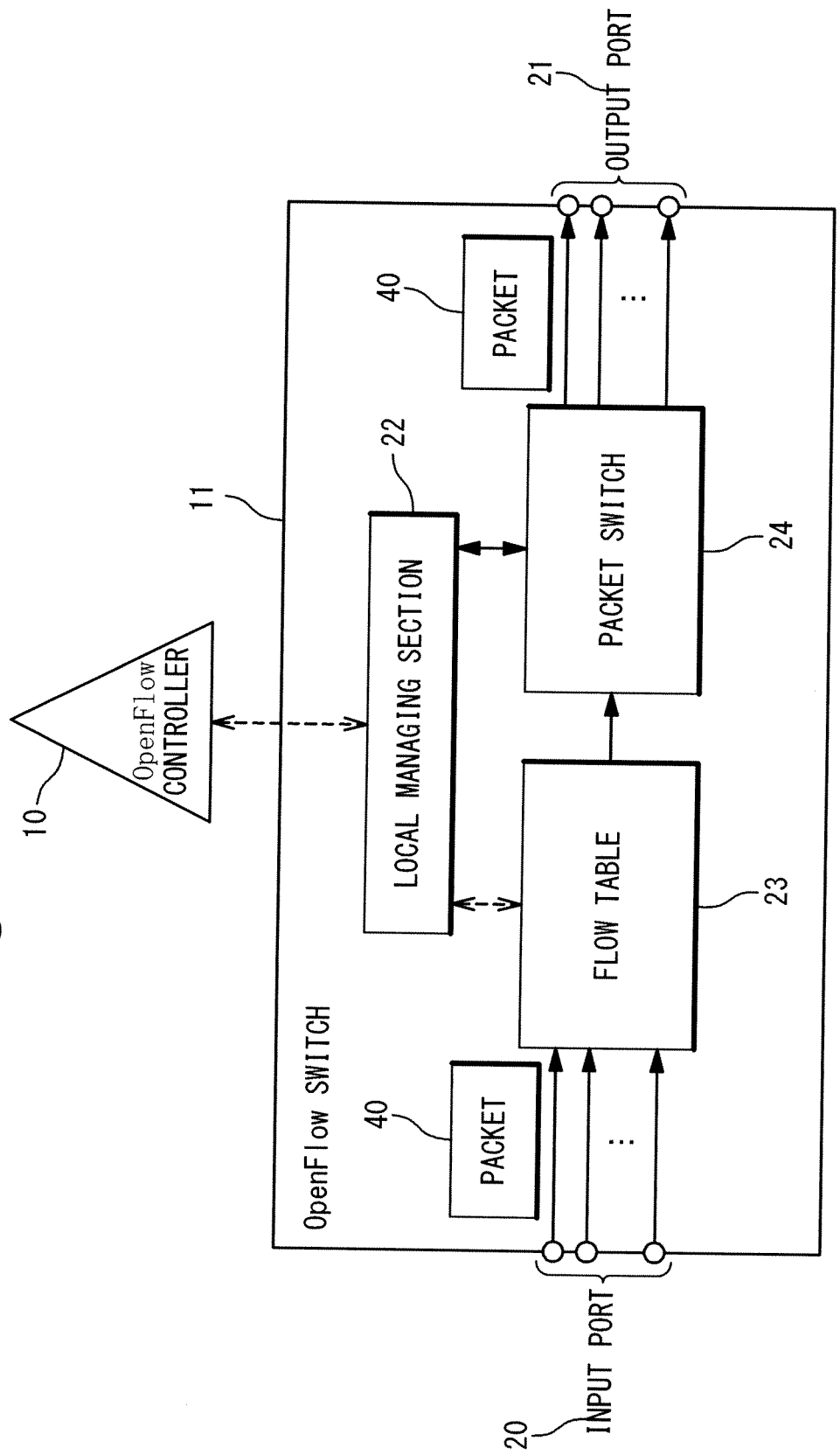
FIG. 2 is a block diagram showing a configuration of an OpenFlow switch 11.
Figure 3:
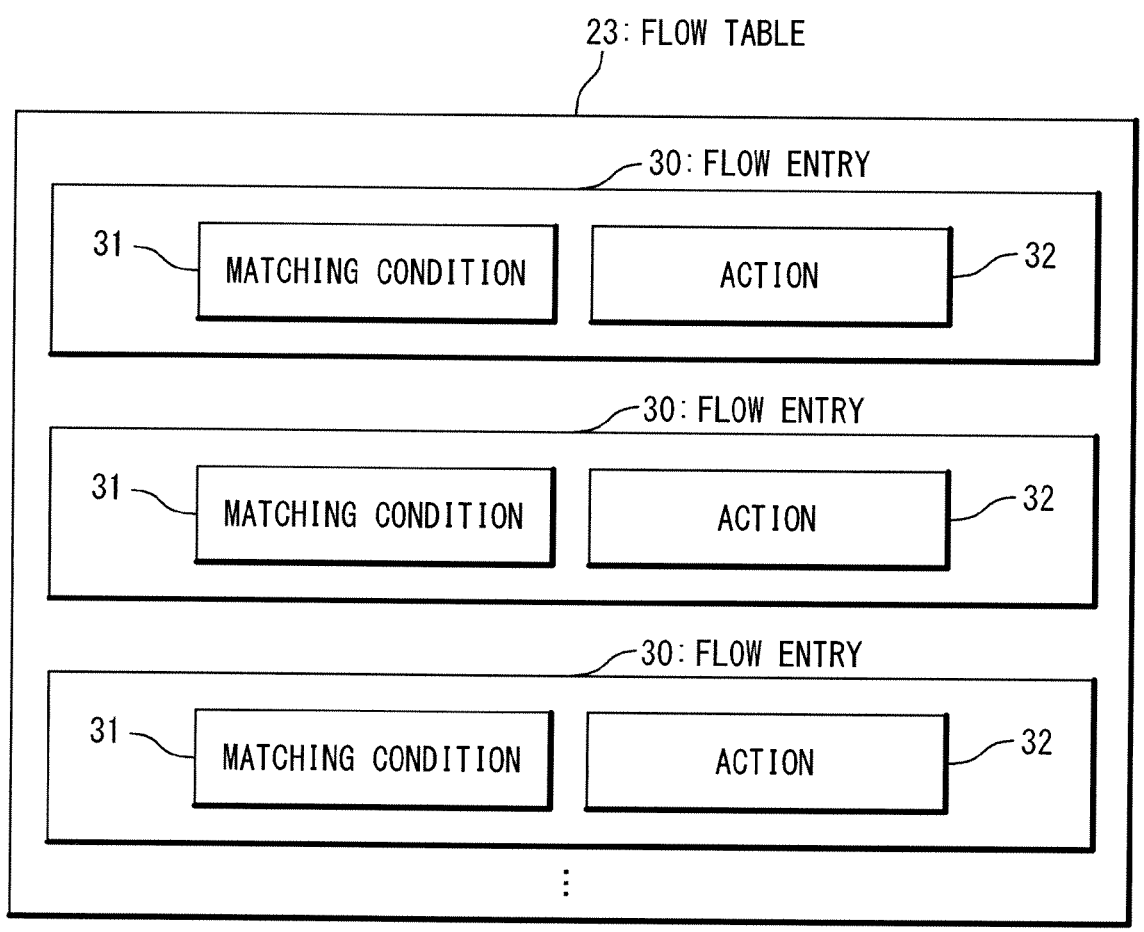
FIG. 3 is a block diagram showing a configuration of a flow table 23.
Figure 4:
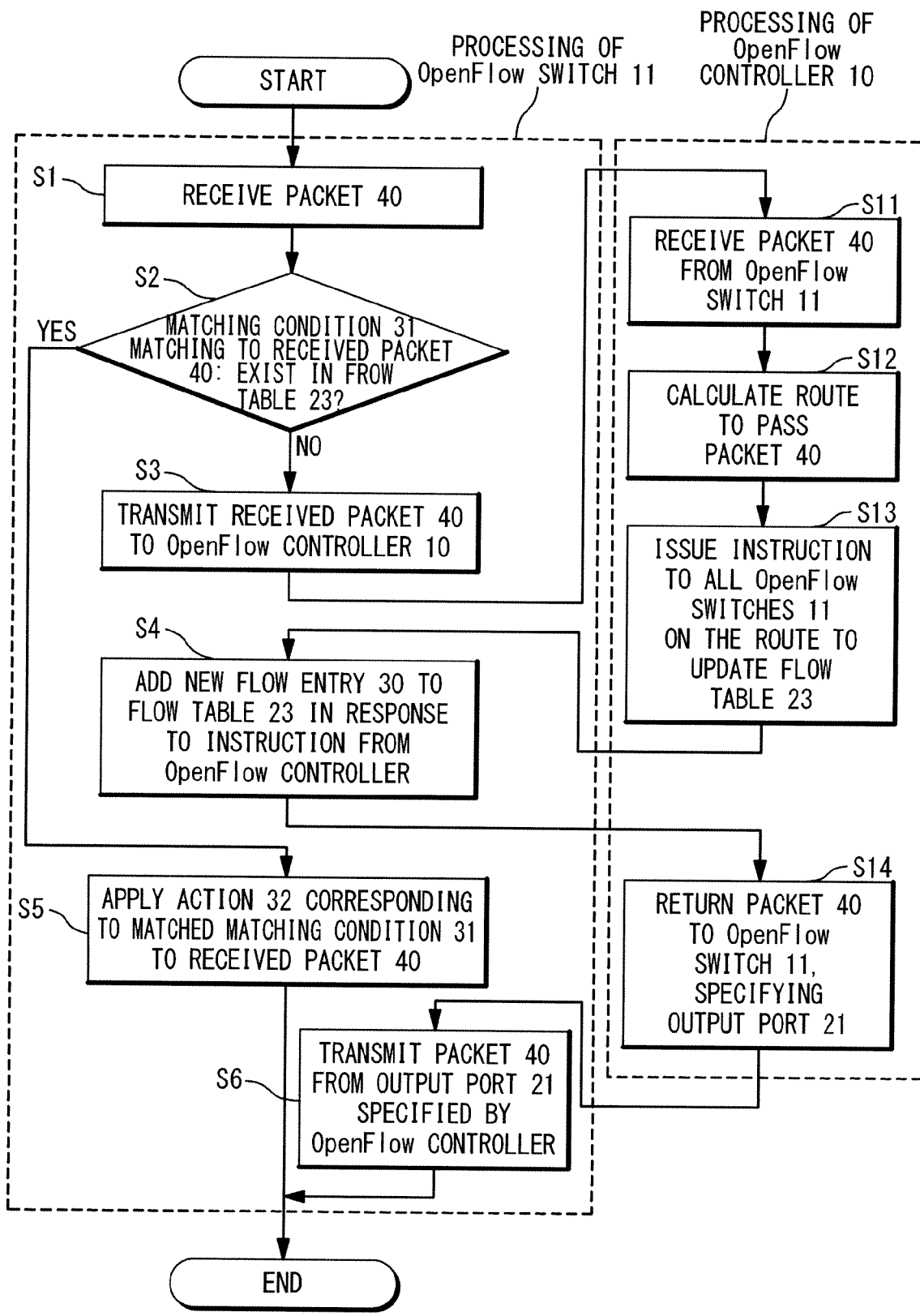
FIG. 4 is a flow chart showing an operation of an OpenFlow controller 10 and the OpenFlow switch 11.

Hereinafter, exemplary embodiments of the present invention will be described in detail with reference to the attached drawings. It should be noted that the same components are assigned with the same reference numerals and repetition of description is omitted.

First Exemplary Embodiment

Figure 6:
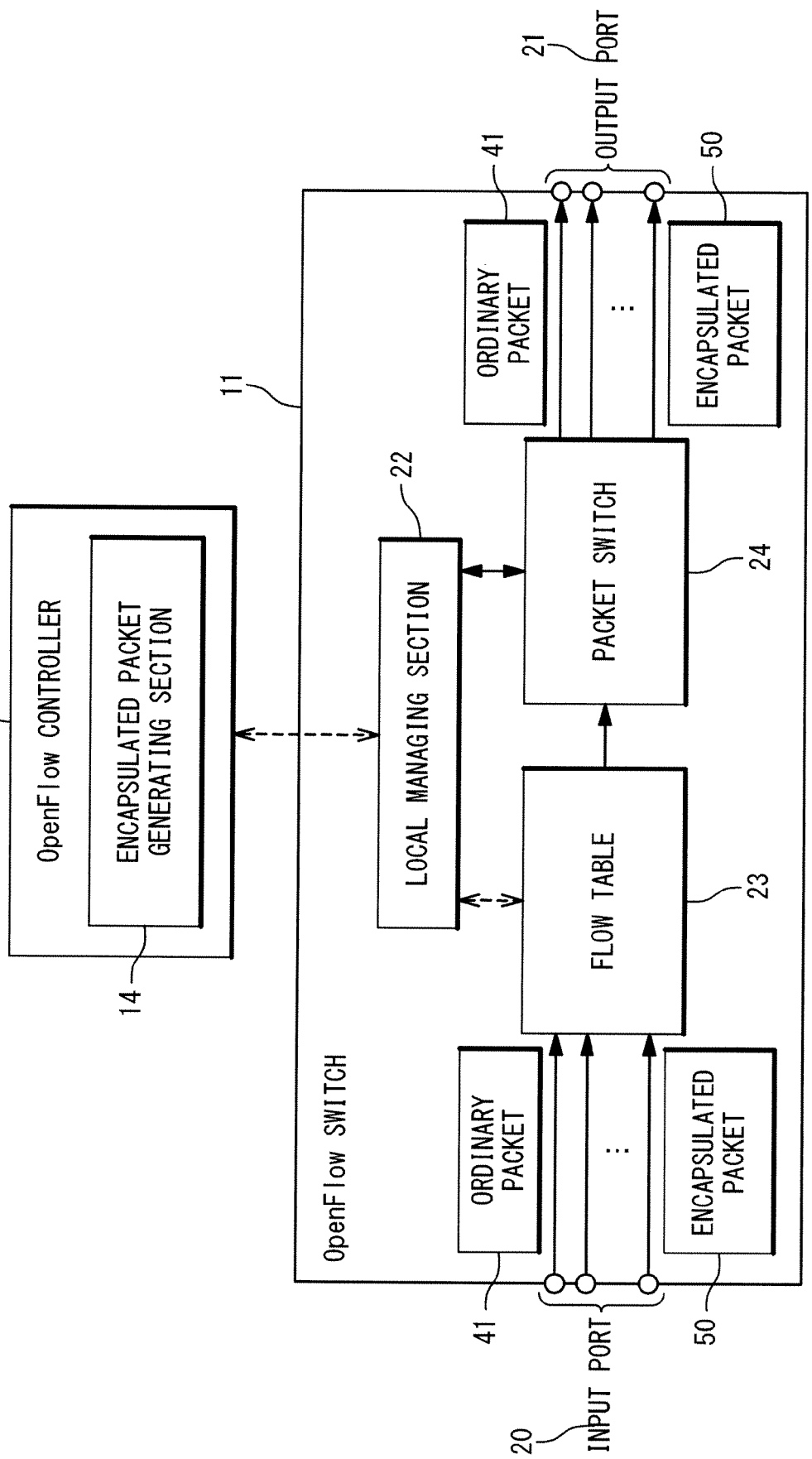
FIG. 6 is a block diagram showing a configuration of an OpenFlow communication system according to a first exemplary embodiment of the present invention.

FIG. 6 is a block diagram showing a configuration of an OpenFlow controller 10 and an OpenFlow switch 11 in an OpenFlow communication system according to a first exemplary embodiment. It should be noted that in the present exemplary embodiment, the overall configuration of the OpenFlow communication system is similar to the above-mentioned configuration shown in FIG. 1. Also, in the current specification of OpenFlow, it is assumed that Ethernet (registered trademark) is used as a protocol for a data link layer and TCP/IP or UDP/IP is used as a protocol on a network layer and a transport layer. However, in the present exemplary embodiment, there is no constraint to the network protocols to be used. Also, in order to identify a plurality of OpenFlow switches 11 and terminals 12 disposed in the OpenFlow communication system, the component is identified by adding with a branch number, like a first OpenFlow switch 11-1, in the following description.

Referring to FIG. 6, an OpenFlow controller 10 of the present exemplary embodiment is provided with an encapsulated packet generating section 14. An operation of the encapsulated packet generating section 14 will be described later. Also, the OpenFlow switch 11 is provided with input ports 20, output ports 21, a local managing section 22, a flow table 23 and a packet switch 24.

The input port 20 receives a packet 40 from the OpenFlow controller 10 or another OpenFlow switch 11. The packet 40 is either of an ordinary packet 41 or an encapsulated packet 50. Also, the input port 20 receives the ordinary packet 41 from a terminal 12. The output port 21 transmits the ordinary packet 41 or the encapsulated packet 50 to the OpenFlow controller 10 or another OpenFlow switch 11. Also, the output port 21 transmits the ordinary packet 41 to the terminal 12.

The local managing section 22 communicates with the OpenFlow controller 10 and updates the flow table 23 in response to an instruction from the OpenFlow controller 10. Also, the local managing section 22 supplies to the packet switch 24, the ordinary packet 41 or the encapsulated packet 50, which are instructed from the OpenFlow controller 10. Moreover, the local managing section 22 transmits the ordinary packet 41 or the encapsulated packet 50, which is supplied through the input port 20 from an external unit, to the OpenFlow controller 10 according to necessity.

The packet switch 24 transfers the ordinary packet 41 or the encapsulated packet 50 to the output port 21 obtained by referring to the flow table 23. Also, the packet switch 24 transfers the ordinary packet 41 or the encapsulated packet 50 to the output port 21 instructed from the local managing section 22.

Figure 7:
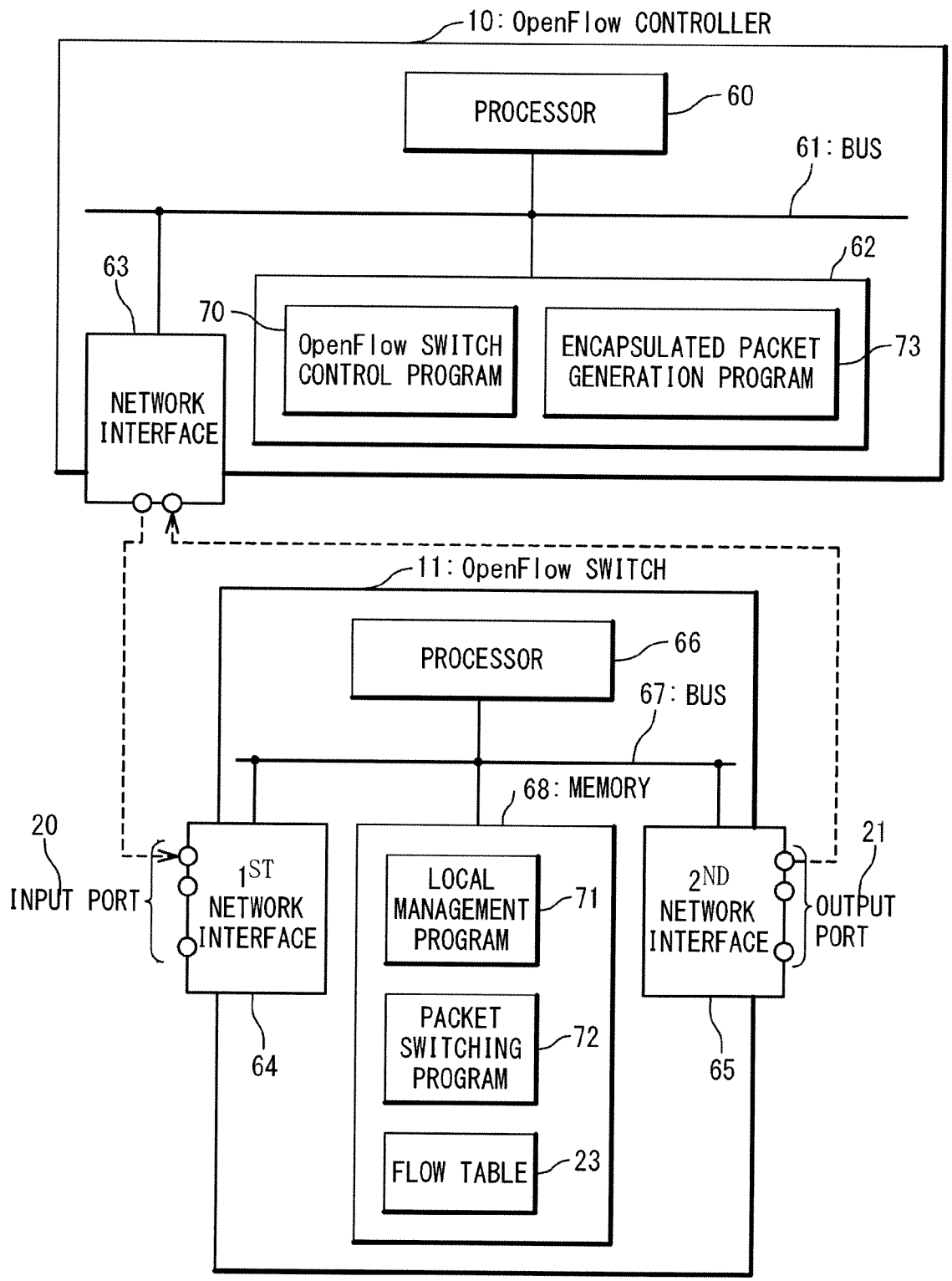
FIG. 7 is a block diagram showing a configuration and connection relation of the OpenFlow controller 10 and the OpenFlow switch 11 in a first exemplary embodiment.

FIG. 7 is a block diagram showing a configuration and connection relation of the OpenFlow controller 10 and the OpenFlow switch 11 in the present exemplary embodiment. Referring to FIG. 7, the OpenFlow controller 10 is provided with a processor 60 on a side of the controller, a memory 62 on the side of the controller, and a network interface 63 on the side of the controller. They are connected through a bus 61 on the side of the controller.

The processor 60 (CPU: central processing unit) on the side of the controller performs the control of various sections of the OpenFlow controller 10 and calculation and processing of data. The processor 60 has a function to execute a program stored in the memory 62. The processor 60 receives data from an input unit (not shown) and a storage unit such as a HDD, and outputs to an output unit (not shown) and a storage unit, after calculation and processing. The network interface 63 is an interface connected with a link 13 which links the Open-Flow controller 10 and the OpenFlow switch 11.

The memory 62 is a semiconductor memory unit accessed directly by the processor 60. The memory 62 stores the data and the program which are handled in the OpenFlow controller 10. The memory 62 is provided with an OpenFlow switch control program 70 and an encapsulated packet generation program 73. The OpenFlow switch control program 70 shows a procedure of control of the OpenFlow switch 11. The encapsulated packet generation program 73 shows a procedure to generate the encapsulated packet.

The OpenFlow switch 11 is provided with a first network interface 64, a second network interface 65, a processor 66 on a side of the switch and a memory 68 on the side of the switch, and they are connected through a bus 67 on the side of the switch.

The first network interface 64 and the second network interface 65 are interfaces to connect the OpenFlow switch 11 with the links 13. It should be noted that the first network interface 64 and the second network interface 65 may be integrated into a single unit. The processor 66 performs the control of various sections of the OpenFlow switch 11, and calculation and processing of data handled in the OpenFlow switch 11. Also, the processor 66 has a function to execute a program stored in the memory 68, and receives data from an input unit (not shown) and storages such as HDD and outputs to an output unit (not shown) and the storage, after calculation and processing.

The memory 68 is a semiconductor memory unit accessed directly by the processor 66. The processor 66 stores data and programs which are handled in the OpenFlow switch 11. The memory 68 is provided with a local management program 71, a packet switch program 72 and the flow table 23.

The local management program 71 shows a procedure for the local managing section 22 of the OpenFlow switch 11. The packet switch program 72 shows a procedure for the packet switch 24 of the OpenFlow switch 11. The flow table 23 retains information to determine the handling of the packet 40 inputted to the OpenFlow switch 11. It should be noted that each computer program which is executed in the OpenFlow controller 10 and the OpenFlow switch 11 in the present exemplary embodiment can be realized in dedicated hardware.

Figure 8:
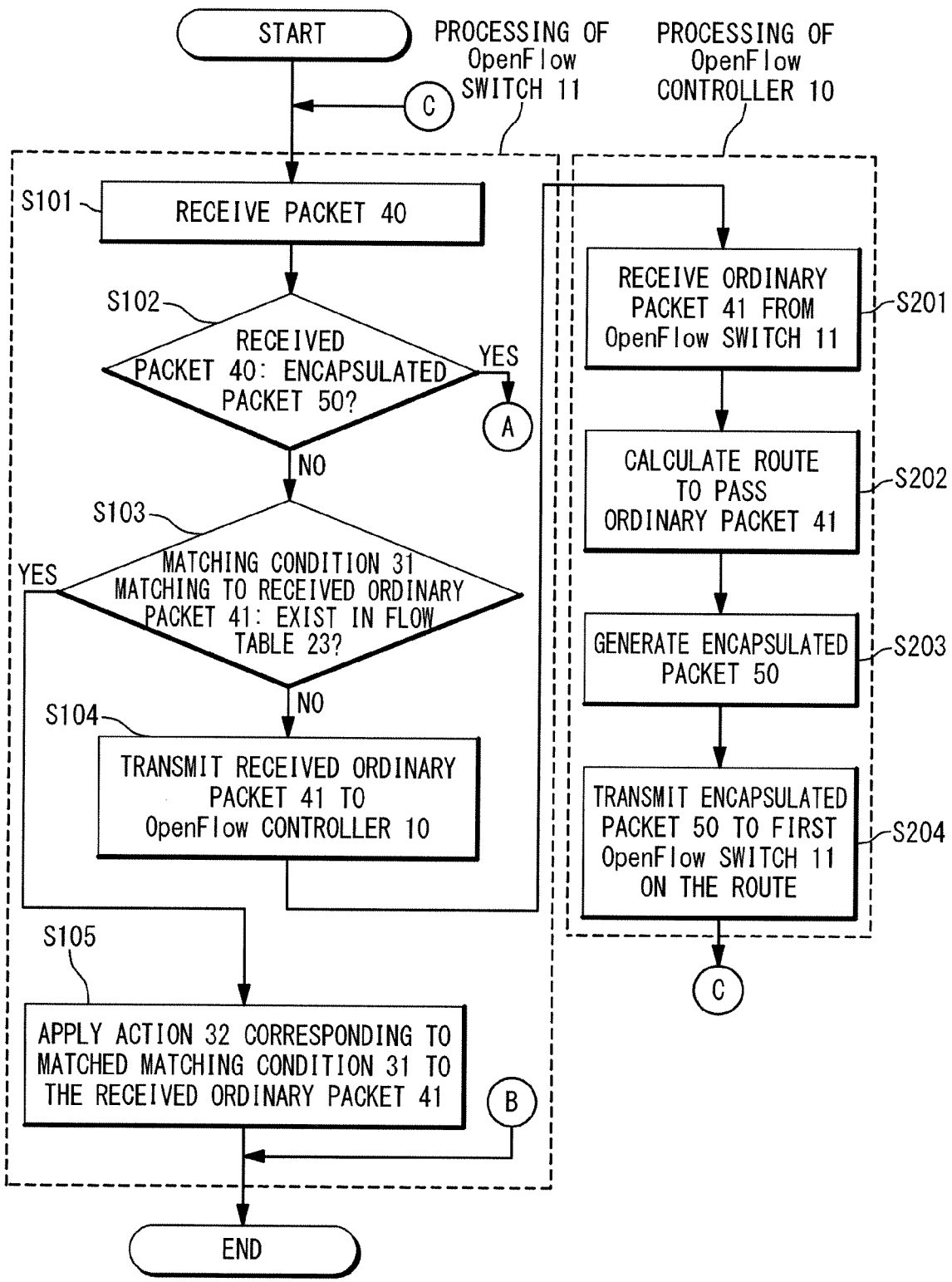
FIG. 8 is a flow chart showing an operation of the OpenFlow communication system in the first exemplary embodiment.
Figure 9:
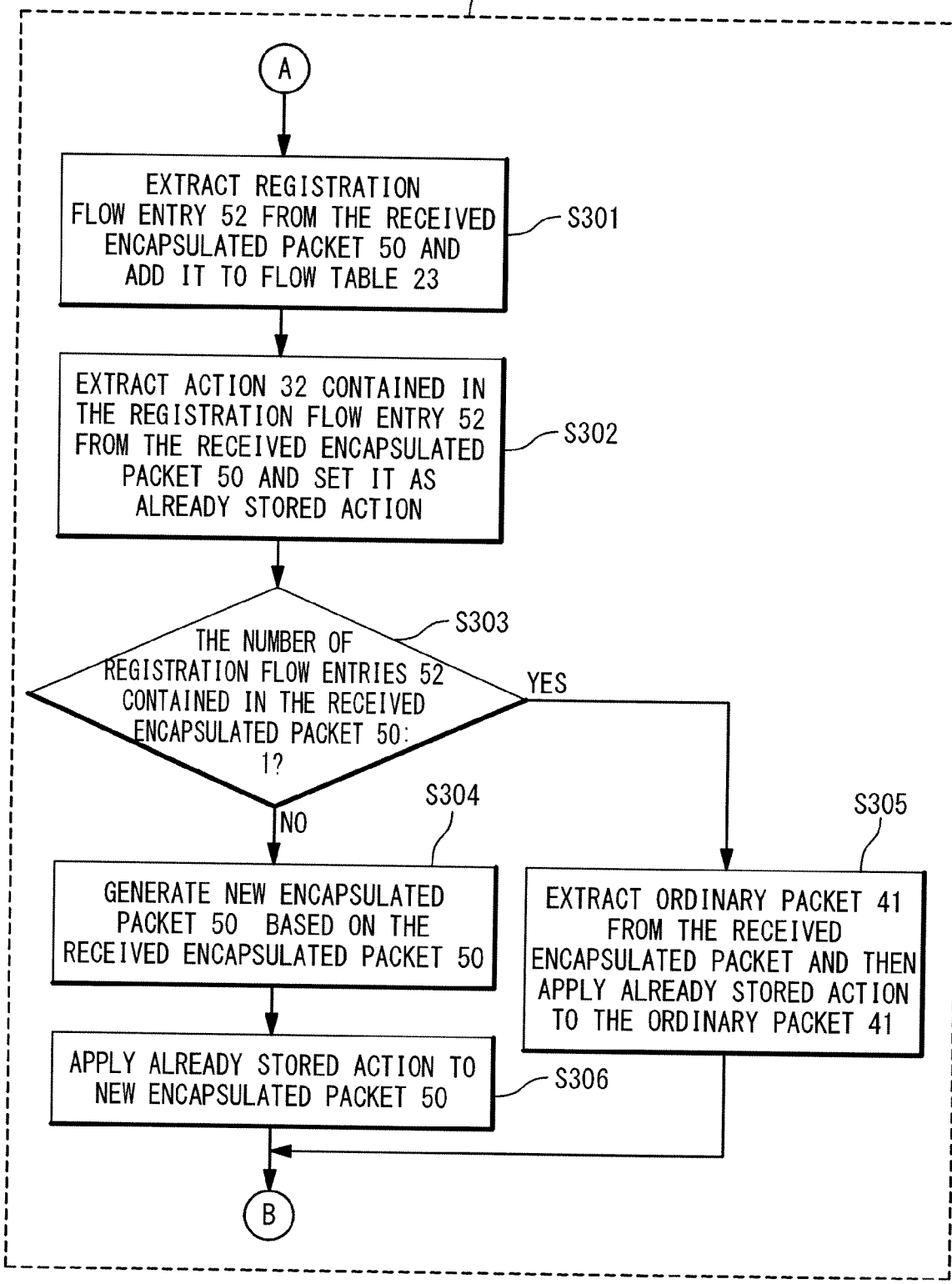
FIG. 9 is a flow chart showing an operation of the OpenFlow communication system in the first exemplary embodiment.

FIG. 8 and FIG. 9 are a flow chart to show an operation of the OpenFlow communication system of the present exemplary embodiment. The operation described below starts when a packet (ordinary packet 41) having another node as a destination is outputted from the terminal 12 of the OpenFlow communication system. At step S101, the OpenFlow switch 11 receives the ordinary packet 41 or the encapsulated packet 50 through the input port 20.

At step S102, the OpenFlow switch 11 determines whether the received packet 40 is the ordinary packet 41 or the encapsulated packet 50. It should be noted that the configuration of the encapsulated packet 50 will be described later. As the result of the determination, when the received packet 40 is the encapsulated packet 50, the control flow advances to step S301 of FIG. 9, and when the received packet 40 is the ordinary packet 41, the control flow advances to step S103. Here, a case that the received packet 40 is the ordinary packet 41 will be described.

At step S103, the OpenFlow switch 11 checks whether or not a matching condition 31 matching to the ordinary packet 41 is in the flow table 23. When the matching condition 31 matching to the ordinary packet 41 is in the flow table 23, the control flow advances to step S105 and when the matching condition 31 is not in the flow table 23, the control flow advances to step S104.

At step S105, because the received packet 40 is the ordinary packet 41 and the matching condition 31 matching to the ordinary packet 41 is in the flow table 23, the OpenFlow switch 11 applies an action 32 corresponding to the matching condition 31 to the ordinary packet 41.

At step S104, because the received packet 40 is not the ordinary packet 41 and any matching condition 31 matching to the ordinary packet 41 is not in the flow table 23, the OpenFlow switch 11 (first OpenFlow switch 11-1) transmits the ordinary packet 41 to the OpenFlow controller 10. Since then, the control flow shifts to the OpenFlow controller 10.

At step S201, the OpenFlow controller 10 receives the ordinary packet 41 supplied from the OpenFlow switch 11. At step S202, the OpenFlow controller 10 extracts addresses of the terminal 12 (first terminal 12-1) as a transmission source and a terminal 12 (third terminal 12-3) as a destination and so on from the ordinary packet 41, and calculates a route to transfer the ordinary packet 41. At step S203, the OpenFlow controller 10 generates the encapsulated packet 50 after the route calculation.

Figure 10:
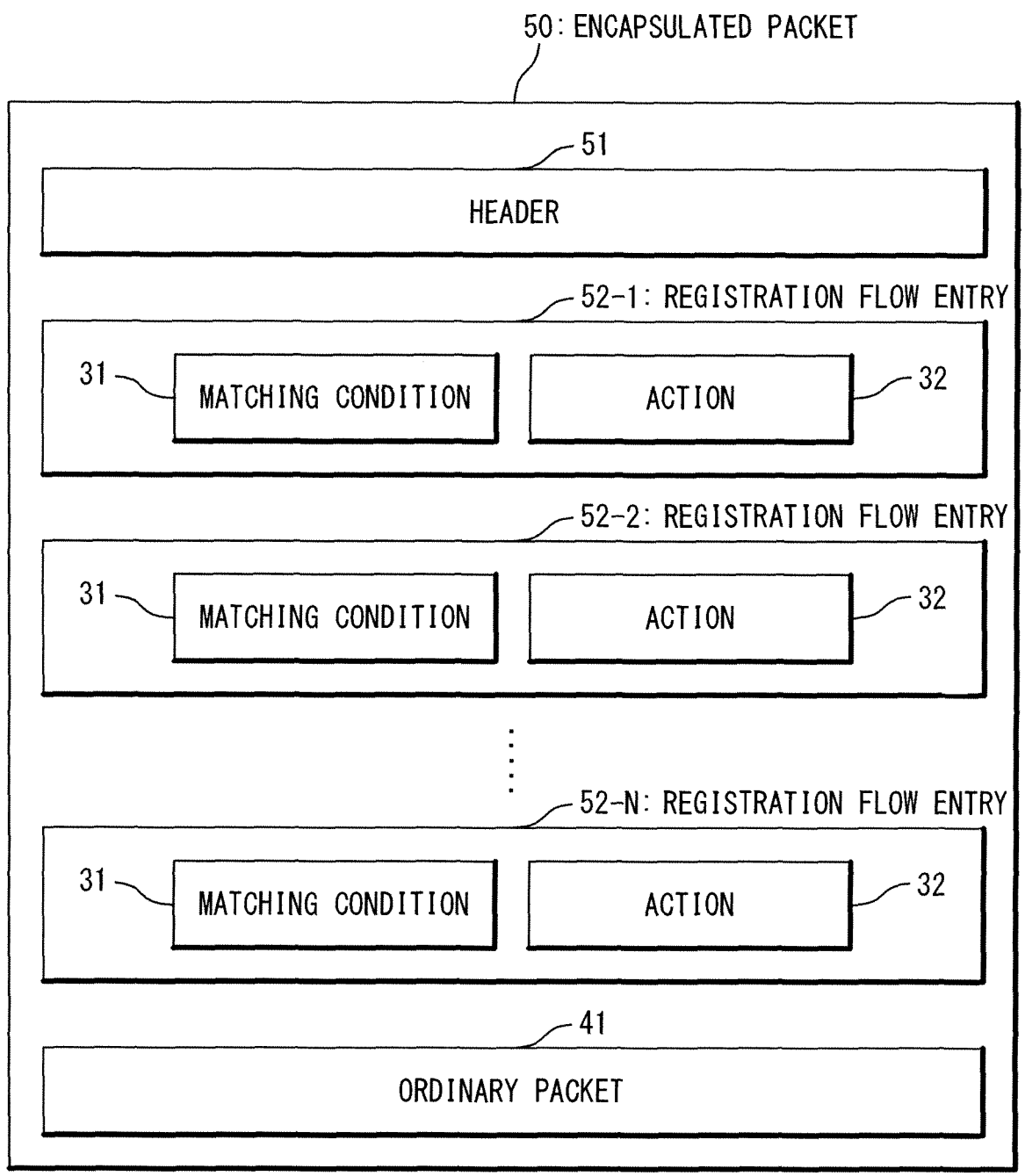
FIG. 10 is a block diagram showing a configuration of an encapsulated packet 50 generated by the OpenFlow controller 10.

FIG. 10 is a block diagram showing a configuration of the encapsulated packet 50 generated by the OpenFlow controller 10. The encapsulated packet 50 is provided with a header 51, one or more registration flow entries 52 and the ordinary packet 41.

The header 51 includes an identifier used when the OpenFlow switch 11 distinguishes the ordinary packet 41 and the encapsulated packet 50. As a distinguishing method, there are a method of allocating a special destination address or a special source address for the encapsulated packet 50, and a method of distinguishing based on a type value Ethernet (registered trademark) and VLAN-ID or a MPLS label, and so on. However, the method is not limited to them.

The $X^{th}$ registration flow entry 52-X ($1 \le X \le N$) is added to the flow table 23 of the $X^{th}$ OpenFlow switch 11 on the route. The registration flow entry 52 is held in the flow table 23 as a flow entry 30. It should be noted that N of the $X^{th}$ registration flow entry 52-X ($1 \le X \le N$) is the number of registration flow entries 52 contained in the encapsulated packet 50. Therefore, the content of the $X^{th}$ registration flow entry 52-X ($1 \le X \le N$) is identical to the content of the flow entry 30 to be added to the $X^{th}$ OpenFlow switch 11 on the route in a conventional OpenFlow.

Referring to FIG. 8 again, at step S204, the OpenFlow controller 10 transmits the generated encapsulated packet 50 to the first OpenFlow switch 11 (first OpenFlow switch 11-1) on the route. Since then, the control flow shifts to the OpenFlow switch 11.

At step S101, the OpenFlow switch 11 receives the encapsulated packet 50 from the OpenFlow controller 10. At step S102, the OpenFlow switch 11 determines whether the packet 40 received through the input port 20 is the ordinary packet 41 or the encapsulated packet 50. At this time, because the received packet 40 is the encapsulated packet 50, the control flow advances to step S301 of FIG. 9.

At step S301, the OpenFlow switch 11 refers to the registration flow entry 52 corresponding to itself from the encapsulated packet 50 to add the content of the registration flow entry 52 to its own flow table 23. In other words, the OpenFlow switch 11 retains information of the registration flow entry 52 obtained through the reference, as the flow entry 30 of the flow table 23 of the OpenFlow switch 11.

At step S302, the OpenFlow switch 11 extracts an action 32 from the registration flow entry 52 of the encapsulated packet 50 corresponding to itself. In the following description, the extracted action 32 is called an already stored action (this is temporary to facilitate the understanding of the operation of the present exemplary embodiment).

At step S303, the OpenFlow switch 11 determines whether or not the number of registration flow entries 52 contained in the encapsulated packet 50 is one. As a result of the determination, when a plurality of registration flow entries 52 are contained, the control flow advances to step S304, and when the number of the registration flow entry 52 is one, the control flow advances to step S305.

At step S304, the OpenFlow switch 11 generates a new encapsulated packet 50 from the received encapsulated packet 50 by removing the registration flow entry 52 added to the flow table 23 from the encapsulated packet 50. In other words, in each OpenFlow switch 11, the new encapsulated packet 50 is generated from the received encapsulated packet 50 by removing the registration flow entry 52 corresponding to the OpenFlow switch 11.

At step S306, the OpenFlow switch 11 applies the already stored action to the new encapsulated packet 50.

At step S305, the OpenFlow switch 11 extracts the ordinary packet 41 from the received encapsulated packet 50 and applies the already stored action to the ordinary packet 41.

The OpenFlow controller in the OpenFlow communication system to which the present exemplary embodiment is not applied must instruct all the OpenFlow switches 11 on the route to update the flow table 23 individually. As described above, the OpenFlow controller 10 in the OpenFlow communication system according to the present exemplary embodiment transmits route information to only the first one of the OpenFlow switches 11 on the route. Accordingly, the OpenFlow controller 10 is not required to instruct the plurality of OpenFlow switches 11 to update the flow tables 23 individually. Therefore, in the OpenFlow communication system of the present exemplary embodiment, it is possible to reduce the processing load of the OpenFlow controller 10.

The operation of the present exemplary embodiment will be described below by using the configuration of a specific encapsulated packet 50 as an example. In the following description, a communication flow of the packet transmission in a case of using the first terminal 12-1 as a transmission source and the third terminal 12-3 as a destination in the above-mentioned OpenFlow communication system of FIG. 1 will be described. Also, in order to facilitate the understanding of the operation of the present exemplary embodiment, it is supposed that the flow tables 23 of all the OpenFlow switches 11 in the OpenFlow communication system are in an initial state, i.e. an empty state.

When the terminal 12 (first terminal 12-1) transmits a first ordinary packet 41 which belongs to a flow, the OpenFlow switch 11 (first OpenFlow switch 11-1) receives the ordinary packet 41 through the input port 20. The OpenFlow switch 11 (first OpenFlow switch 11-1) determines whether the packet 40 received through the input port 20 is the ordinary packet 41 or the encapsulated packet 50. At an initial state, the packet 40 is the ordinary packet 41 received from first terminal 12-1 and is not the encapsulated packet 50. Therefore, this determination result is No (false). Also, because the flow table 23 is empty at the initial time, the search of the flow table 23 fails.

The received packet 40 is the ordinary packet 41 and the matching condition 31 matching to the ordinary packet 41 is not in the flow table 23. Therefore, the OpenFlow switch 11 (first OpenFlow switch 11-1) transmits the ordinary packet 41 to the OpenFlow controller 10. Since then, the control flow shifts to the OpenFlow controller 10.

The OpenFlow controller 10 receives the ordinary packet 41 supplied from the first OpenFlow switch 11-1. The OpenFlow controller 10 extracts the addresses of the terminal 12 (first terminal 12-1) as a transmission source and the terminal 12 (third terminal 12-3) as a destination and so on from the ordinary packet 41 and calculates a communication route used to transfer the ordinary packet 41. In the present exemplary embodiment, the communication route of the ordinary packet 41 from the first OpenFlow switch 11-1 to a second OpenFlow switch 11-2 to a third OpenFlow switch 11-3 is selected. Here, the OpenFlow controller 10 generates the encapsulated packet 50 after the communication route is calculated by performing the operation up to the above-mentioned step S203.

Figure 11:
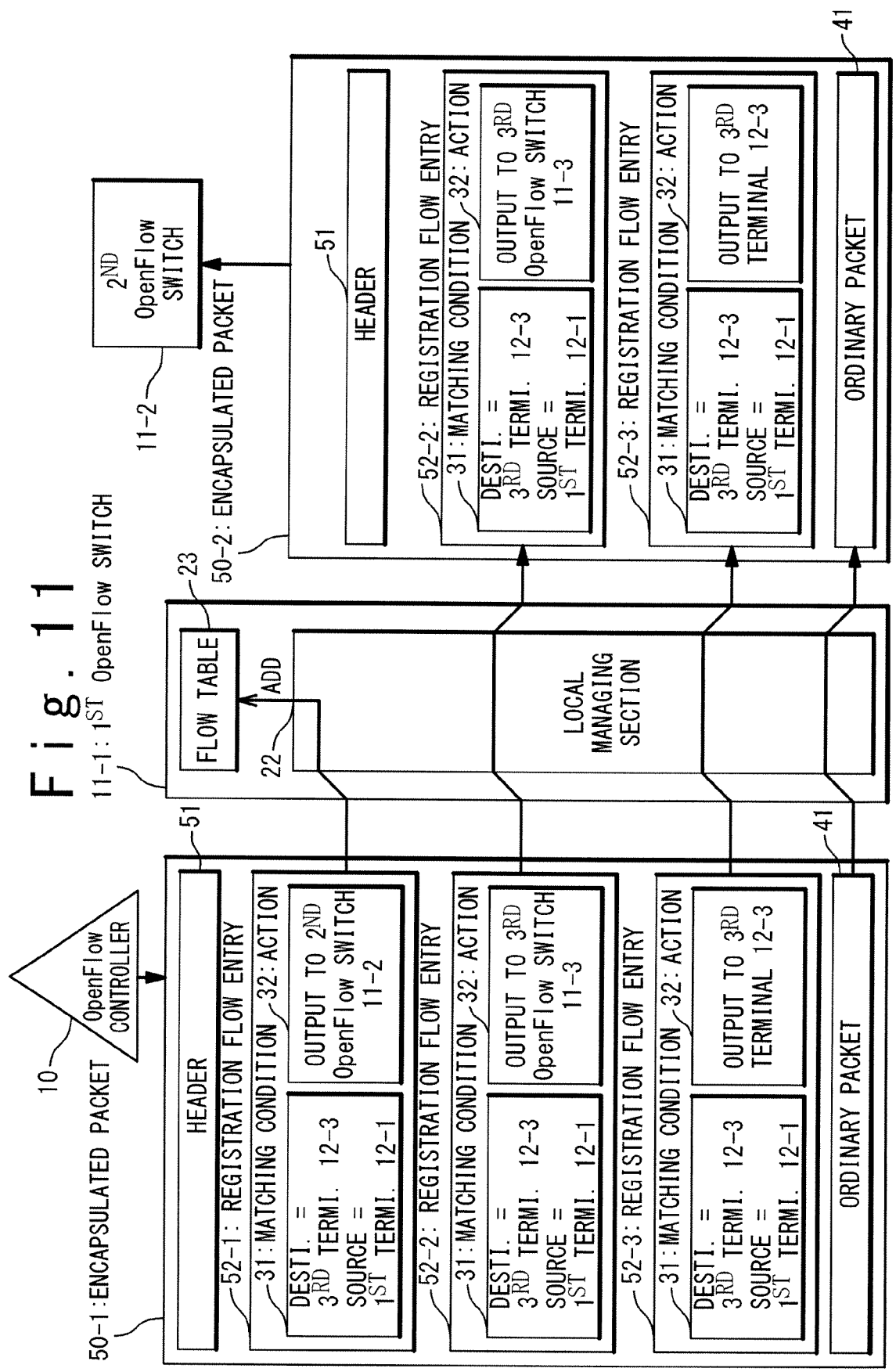
FIG. 11 is a diagram showing a configuration of a first encapsulated packet 50-1 and a second encapsulated packet 50-2.

FIG. 11 shows a configuration of the encapsulated packet 50 (first encapsulated packet 50-1) generated by the OpenFlow controller 10 and a configuration of the encapsulated packet 50 (second encapsulated packet 50-2) outputted from the first OpenFlow switch 11-1. The content of the encapsulated packet 50 generated by the OpenFlow controller 10 is like the first encapsulated packet 50-1 of FIG. 11. As shown in FIG. 11, the OpenFlow controller 10 transmits the generated encapsulated packet 50 (first encapsulated packet 50-1) to the first OpenFlow switch (first OpenFlow switch 11-1) on the communication route. Since then, the control flow shifts to the OpenFlow switch 11.

The OpenFlow switch 11 (first OpenFlow switch 11-1) receives the encapsulated packet 50 (first encapsulated packet 50-1) from the OpenFlow controller 10. The OpenFlow switch 11 (first OpenFlow switch 11-1) determines whether the packet 40 received through the input port 20 is the ordinary packet 41 or the encapsulated packet 50. At this time, because the received packet 40 is the encapsulated packet 50, the first OpenFlow switch 11-1 extracts a first registration flow entry 52 (first registration flow entry 52-1) from the encapsulated packet 50 and adds and registers the extracted flow entry to its own flow table 23. In other words, the first OpenFlow switch 11-1 retains the first registration flow entry 52-1 as the flow entry 30 of the flow table 23 of the first OpenFlow switch 11-1.

The content of the already stored action having registered in the first OpenFlow switch 11-1 at this point is the same as the action 32 of first registration flow entry 52-1, and is "output toward the second OpenFlow switch 11-2". Also, because the number of registration flow entries 52 contained in the encapsulated packet 50 is plural, the OpenFlow switch 11 generates a new encapsulated packet 50 based on the received encapsulated packet 50 by deleting the registration flow entry 52 which have been added to the flow table 23 from the encapsulated packet 50. The OpenFlow switch 11 applies the already stored action to the new encapsulated packet 50. As described above, because the already stored action at this point is "output for the second OpenFlow switch 11-2", the new encapsulated packet 50 (second encapsulated packet 50-2) is transmitted to the second OpenFlow switch 11-2 through the output port 21 which is connected with the second OpenFlow switch 11-2.

Figure 12:
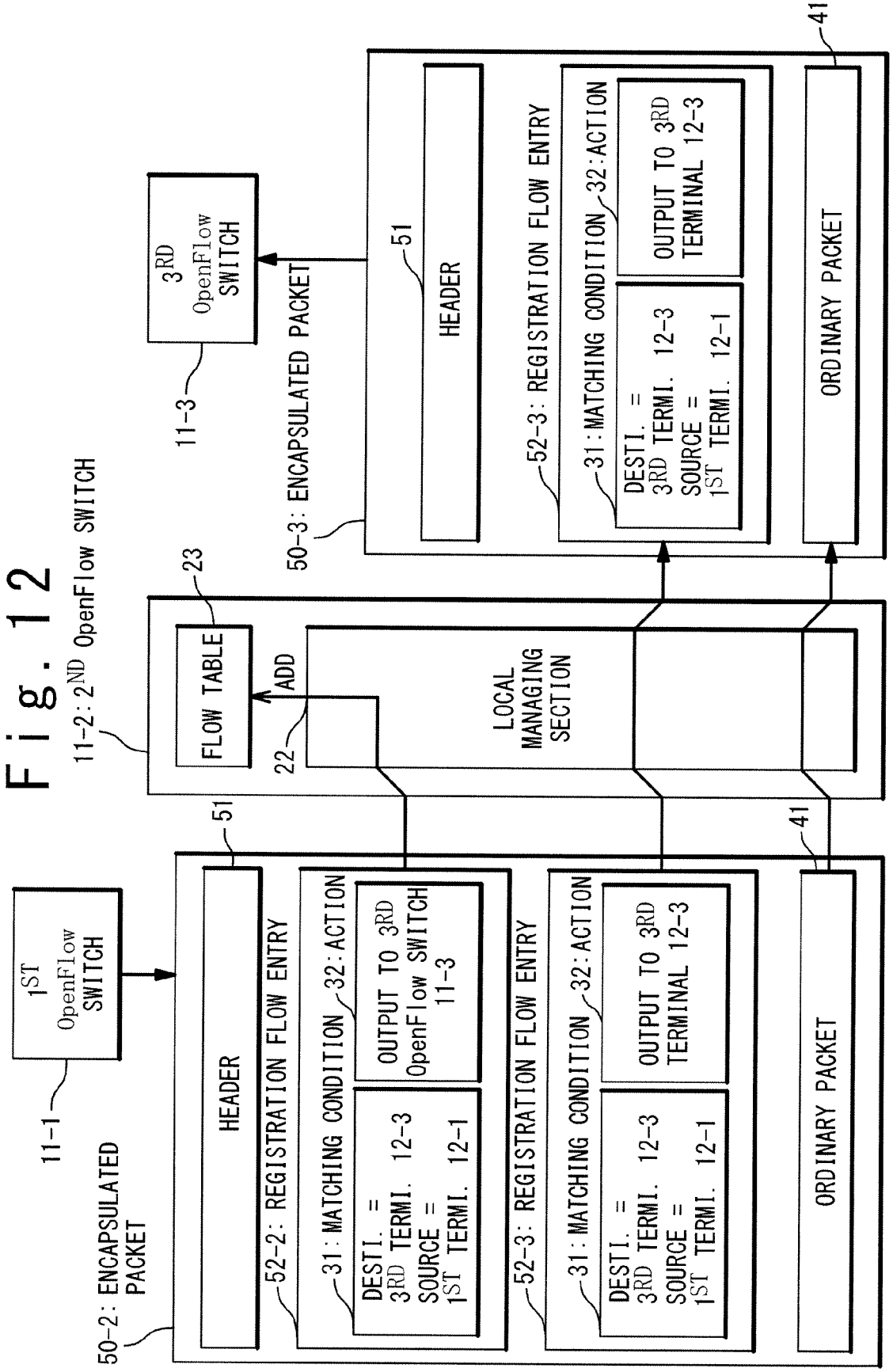
FIG. 12 is a block diagram showing the processing to be performed on the second encapsulated packet 50-2.

FIG. 12 is a block diagram showing processing of the second encapsulated packet 50-2. Another OpenFlow switch 11 (second OpenFlow switch 11-2) receives the packet 40 (second encapsulated packet 50-2) from the OpenFlow switch 11 (first OpenFlow switch 11-1) at the front-stage, and determines whether or not the packet 40 is the encapsulated packet 50, after the reception, and executes the above steps S301 to S304.

The second OpenFlow switch 11-2 generates a third encapsulated packet 50-3. Because the stored action at this point is "output for the third OpenFlow switch 11-3", the new encapsulated packet 50 (third encapsulated packet 50-3) is transmitted to the third OpenFlow switch 11-3.

Figure 13:
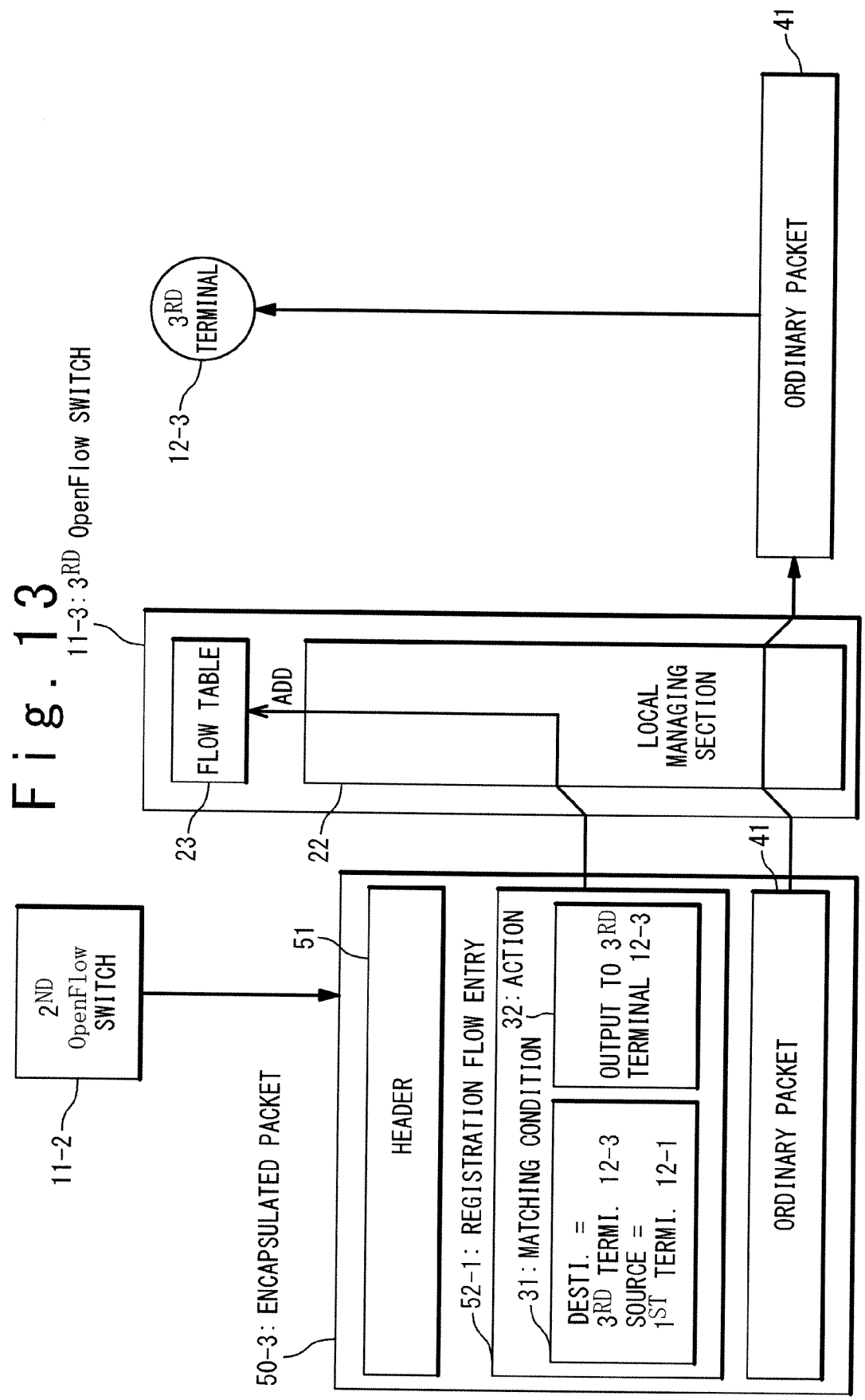
FIG. 13 is a block diagram showing the processing to be performed on a third encapsulated packet 50-3.

FIG. 13 is a block diagram showing processing of the third encapsulated packet 50-3. The third OpenFlow switch 11-3 receives the encapsulated packet 50 (third encapsulated packet 50-3) from the second OpenFlow switch 11-2. The action at this point is "output for the third terminal 12-3". The number of registration flow entries 52 contained in the encapsulated packet 50 (third encapsulated packet 50-3) received by the third OpenFlow switch 11-3 is 1. Therefore, the ordinary packet 41 is extracted from the received encapsulated packet 50 and the already stored action is applied to the ordinary packet 41. As described above, because the action at this point is "output for the third terminal 12-3", the ordinary packet 41 is transmitted to the third terminal 12-3.

Figure 5:
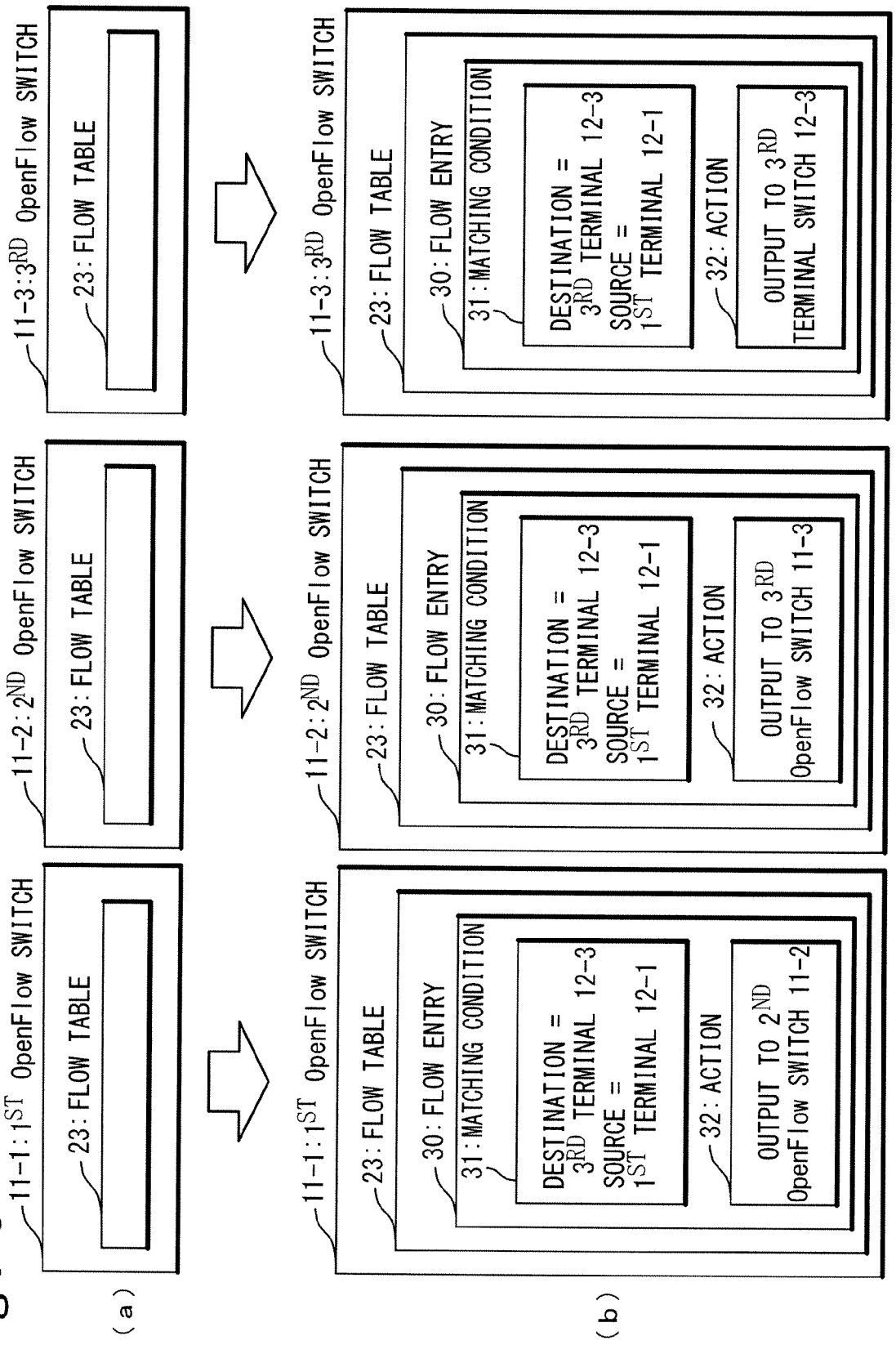
FIG. 5 is a block diagram showing a configuration of the flow table 23 when a new flow entry 30 is added.

As above mentioned, the first ordinary packet 41 in the flow is relayed and is finally sent to the third terminal 12-3 as the destination. Finally, the contents of the flow tables 23 of the first OpenFlow switch 11-1 to the third OpenFlow switch 11-3 are as shown in (b) of FIG. 5.

The subsequent ordinary packets 41 which belong to the same flow pass from the first OpenFlow switch 11-1, to the second OpenFlow switch 11-2, to the third OpenFlow switch 11-3 in order without going through the OpenFlow controller 10, and are transferred to the destination. The reason of operating in this way is that the matching conditions 31 matching to the ordinary packet 41 are registered on the flow tables 23 of these OpenFlow switches 11 at this point. The determination result of step S103 is true at the flow chart of FIG. 8 and the control flow branches to step S105. The action 32 corresponding to the matching condition 31 is applied to the ordinary packets 41.

It should be noted that in the flow chart of

FIG. 8, the execution order of step S102 and step S103 is changeable. Contrary to the above-mentioned operation description, step S103 may be executed earlier than step S102.

Second Exemplary Embodiment

A second exemplary embodiment of the present invention will be described below with reference to the drawings. The OpenFlow communication system according to the second exemplary embodiment executes the determination of whether the received packet 40 is the ordinary packet 41 or the encapsulated packet 50 by referring to the flow table 23 of the OpenFlow switch 11.

Figure 14:
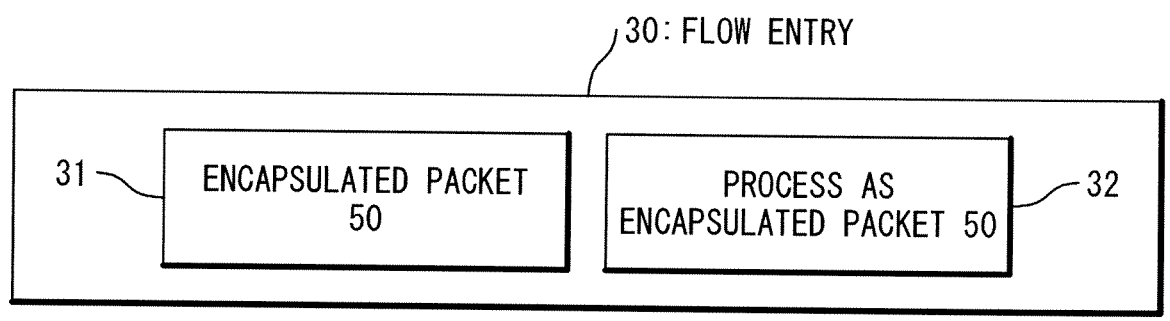
FIG. 14 is a block diagram showing a configuration of a flow entry 30 retained in the flow table 23 of the OpenFlow switch 11 in a second exemplary embodiment.

FIG. 14 is a block diagram showing the configuration of the flow entry 30 held by the flow table 23 of the OpenFlow switch 11 in the second exemplary embodiment. In the second exemplary embodiment, the flow entry 30 of FIG. 14 is registered on the flow table 23 of all the OpenFlow switches 11 in advance.

FIG. 15 is a flow chart showing the operation of the OpenFlow communication system in the second exemplary embodiment. The operation of the second exemplary embodiment is different from the operation of the first exemplary embodiment. A step of distinguishing the ordinary packet 41 and the encapsulated packet 50 from each other is executed based on the flow entry 30 of the flow table 23. In the following description, when the encapsulated packet 50 supplied from the OpenFlow controller 10 is inputted to the OpenFlow switch 11, the operation of the OpenFlow switch 11 in the second exemplary embodiment will be described using a flow chart of FIG. 15.

At step S101, the OpenFlow switch 11 receives the packet 40 (the encapsulated packet 50 in this case) supplied through the input port 20. At step S103, the OpenFlow switch 11 checks whether or not the matching condition 31 matching to the ordinary packet 41 is in the flow table 23. As mentioned above, the flow entry 30 of FIG. 14 is registered on the flow tables 23 of all the OpenFlow switches 11. Also, the received packet 40 is the encapsulated packet 50. Therefore, the search of the flow table 23 succeeds and the control flow advances to step S107.

At step S107, the action 32 corresponding to the matching condition 31 is read out. The action 32 becomes "processing as the encapsulated packet 50". Therefore, the determination result of step S107 becomes Yes (true) and the packet 40 is processed as the encapsulated packet 50. The subsequent processing is the same as that of the first implementation example.

Above, the exemplary embodiments of the present invention have been specifically described. The present invention is not limited to the above-mentioned exemplary embodiments and it is possible to carry out modifications in a range not deviated from the scope of the present invention. Thus, various modifications of the above exemplary embodiments can be carried out easily. Therefore, the present invention is never limited to the above exemplary embodiments and is interpreted in the widest range with reference to the drawings and the description. It should be noted that this patent application claims a priority on convention based on Japanese Patent Application No. 2009-055739 filed on Mar. 9, 2009 and the disclosure thereof is incorporated herein by reference.

What is claimed is:

1. A communication system comprising:
    switches arranged in a network, the switches comprising a flow table; and
    a controller,
    wherein said switches are arranged in an order on a network route, and if a first switch of said switches receives a first packet of a communication flow, then the first switch determines whether the first packet comprises a first ordinary packet or a first encapsulated packet, and if the first packet is determined by the first switch to be a first ordinary packet and there is no matching condition in the flow table of the first switch, then said first switch transfers said first ordinary packet to said controller,
    wherein said controller generates an encapsulated packet having flow entries for said switches on said network route in response to the reception of said first ordinary packet, and transmits said encapsulated packet to said first switch, and
    wherein said switches on said network route sequentially retain said flow entries of said encapsulated packet in the flow tables while transferring said encapsulated packet, respectively, such that said ordinary packet is transferred from said first switch to a destination through at last one of said switches by using said flow entries.

2. The communication system according to claim 1,
    wherein each of said flow entries is stored in said flow table of a corresponding one of said switches, and said flow entry comprises a matching condition to identify a communication flow of said ordinary packet and an action which shows processing to be performed on said ordinary packet, and
    wherein said first switch searches said flow table of said first switch in response to the reception of said first ordinary packet, and supplies said first ordinary packet to said controller, when any flow entry which contains the matching condition matching to the communication flow of the first ordinary packet is not registered on said flow table.

3. The communication system according to claim 1, wherein said controller determines said network route through which said ordinary packet is transferred, in response to the reception of said ordinary packet, generates said encapsulated packet containing said flow entries for said switches, and supplies said encapsulated packet to said first switch.

4. The communication system according to claim 1, wherein each of said switches extracts said flow entry for said switch from said encapsulated packet, transmits said encapsulated packet to a next one of said switches on said network route, when at least one flow entry is remained in said encapsulated packet, and said switch as a last switch transmits said ordinary packet contained in said encapsulated packet to said destination, when no flow entry is contained in said encapsulated packet.

5. The communication system according to claim 2, wherein each of said switches searches said flow table of said switch for said flow entry for said communication flow of said ordinary packet in response to the reception of said ordinary packet, and executes processing on said ordinary packet based on the action of the searched flow entry, when the flow entry which contains the matching condition matching to said communication flow of said received ordinary packet has been registered on said flow table.

6. A communication method comprising:
transferring a first packet destined to a destination of a communication flow to a controller from a first switch of switches, which are arranged in an order on a network route, in response to reception of said first packet;
determining whether the first packet comprises a first ordinary packet or a first encapsulated packet;
if the first packet is determined by the first switch to be a first ordinary packet and there is no matching condition in a flow table of the first switch, then generating an encapsulated packet having flow entries for said switches on said network route in said controller in response to the reception of said first ordinary packet;
transmitting said encapsulated packet to said first switch; and
sequentially retaining said flow entries of said encapsulated packet in flow tables of said switches on said network route while transferring said encapsulated packet, respectively, such that said ordinary packet is transferred from said first switch to a destination through at last one of said switches by using said flow entries.

7. The communication method according to claim 6, wherein said transferring a first ordinary packet comprises:
searching the flow table of said first switch in response to reception of said first ordinary packet;
supplying said first ordinary packet to said controller when any flow entry which contains a matching condition matching to the communication flow of said first ordinary packet is not registered on said flow table.

8. The communication method according to claim 7, wherein said generating an encapsulated packet comprises:
specifying a network route of said switches on the network in an order of transfer of said first ordinary packet in response to the reception of said first ordinary packet by said controller; and
generating said encapsulated packet which contains said flow entries for said switches, after generating said flow entries based on said switches on the specified network route.

9. The communication method according to claim 6, wherein said sequentially retaining said flow entries comprises:
transmitting, when the number of said flow entries contained in said encapsulated packet is equal to or more than two, said encapsulated packet from a switch of said switches to a next switch on said network route, after one of said flow entries for said switch is extracted and registered in said switch; and
transmitting, when the number of said flow entries contained in said encapsulated packet is one, said ordinary packet which is contained in said encapsulated packet, from a last switch of said switches to said destination, after said flow entry is extracted and registered in said last switch.

10. The communication method according to claim 6, further comprising:
searching said flow table of one of said switches in response to reception of an ordinary packet of the communication flow by said switch; and
executing, when the flow entry which contains the matching condition matching to the communication flow of said ordinary packet has been registered on said flow table, processing on said ordinary packet based on an action of the registered flow entry.

11. A computer-readable non-transitory recording medium which computer-executable switch program code to attain a switching method performed in switches on a network route, each of said switches having a flow table, wherein said switching method comprises:
receiving a first packet of plural packets destined to a destination of a communication flow by a first switch of said switches on a network route;
determining whether the first packet comprises a first ordinary packet or a first encapsulated packet;
if the first packet is determined to be a first ordinary packet and there is no matching condition in a flow table of the first switch, then transferring said first ordinary packet from said first switch to a controller;
receiving an encapsulated packet from said controller by said first switch; and
transferring said encapsulated packet from each of said switches to a next one of said switches such that said encapsulated packet is transferred from said first switch to a last one of said switches and said first ordinary packet is transferred from said last switch to said destination, said switches on said network route sequentially retaining flow entries of said encapsulated packet in the flow tables in said transferring of said encapsulated packet, respectively, such that said first ordinary packet is transferred from said first switch to the destination through the last one of said switches by using said flow entries.

12. The computer-readable non-transitory recording medium according to claim 11, wherein said transferring said first ordinary packet comprises:
searching said flow table of said first switch in response to the reception of said first ordinary packet; and
supplying said first ordinary packet to said controller, when any flow entry which contains a matching condition matching to the communication flow of said first ordinary packet is not registered on said flow table.

13. The computer-readable non-transitory recording medium according to claim 11, wherein said transferring said encapsulated packet comprises:
  when two or more flow entries are contained in said encapsulated packet, transmitting said encapsulated packet to said next switch on said route, after said registration flow entry for one is extracted; and
  when one flow entry is contained in said encapsulated packet, transmitting to said destination, said first ordinary packet contained in said encapsulated packet.

14. A computer-readable non-transitory recording medium which computer-executable control program code to attain a control method performed in a controller, wherein said control method comprises:
  receiving a packet from a first switch;
  determining whether the packet comprises an ordinary packet or an encapsulated packet;
  if the first packet is determined to be an ordinary packet and there is no matching condition in a flow table of the first switch, then specifying a network route of switches, including said first switch, on the network in an order of transfer of said ordinary packet;
  generating flow entries based on said switches on the specified network route, each of said flow entries comprising a matching condition to identify a communication flow of said ordinary packet and an action which shows processing to be performed on said ordinary packet;
  generating said encapsulated packet which contains said generated flow entries and said ordinary packet; and
  transferring said encapsulated packet on said network route of switches and sequentially retaining flow entries of said encapsulated packet in flow tables of said switches respectively, such that said first ordinary packet is transferred from said first switch to a destination through a last one of said switches by using said flow entries.

15. The communication system according to claim 1, wherein the first switch comprises:
  a flow table which stores information to determine a handling of the first packet inputted to the switch; and
  a local managing section which communicates with the controller and updates the flow table in response to an instruction from the controller.

16. The communication system according to claim 15, wherein the first switch further comprises:
  a plurality of input ports and a plurality of output ports; and
  a packet switch which transfers the first packet to an output port of the plurality of output ports by referring to the flow table.

17. The communication system according to claim 16, wherein the local managing section supplies to the packet switch with the first ordinary packet or the first encapsulated packet, which are instructed from the controller, and
  wherein the local managing section transmits the ordinary packet or the encapsulated packet which is supplied through an input port of the plurality of the input ports from an external unit, to the controller according to necessity.

18. The communication system according to claim 1, wherein the controller comprises:
  a memory for storing an encapsulated packet generation program;
  a processor which accesses the memory and executes the encapsulated packet generation program to cause the controller to generate an encapsulated packet.

19. The communication system according to claim 1, wherein if the first packet is determined by the first switch to be a first encapsulation packet, then the first switch refers to the registration flow entry of the encapsulated packet which corresponds to the first switch, to add a content of the registration flow entry to the flow table of the first switch.

20. The communication system according to claim 1, wherein if the first packet is determined by the first switch to be a first ordinary packet, and there is a matching condition in the flow table of the first switch, then the switch applies an action corresponding to the matching condition to the first ordinary packet.

* * * * *